March 8, 1955   L. K. HERNDON   2,703,749
SLUDGE DECOMPOSING KILN
Filed May 29, 1951   6 Sheets-Sheet 1

INVENTOR
Lyle K. Herndon
BY Adams, Forward & McLean
ATTORNEY

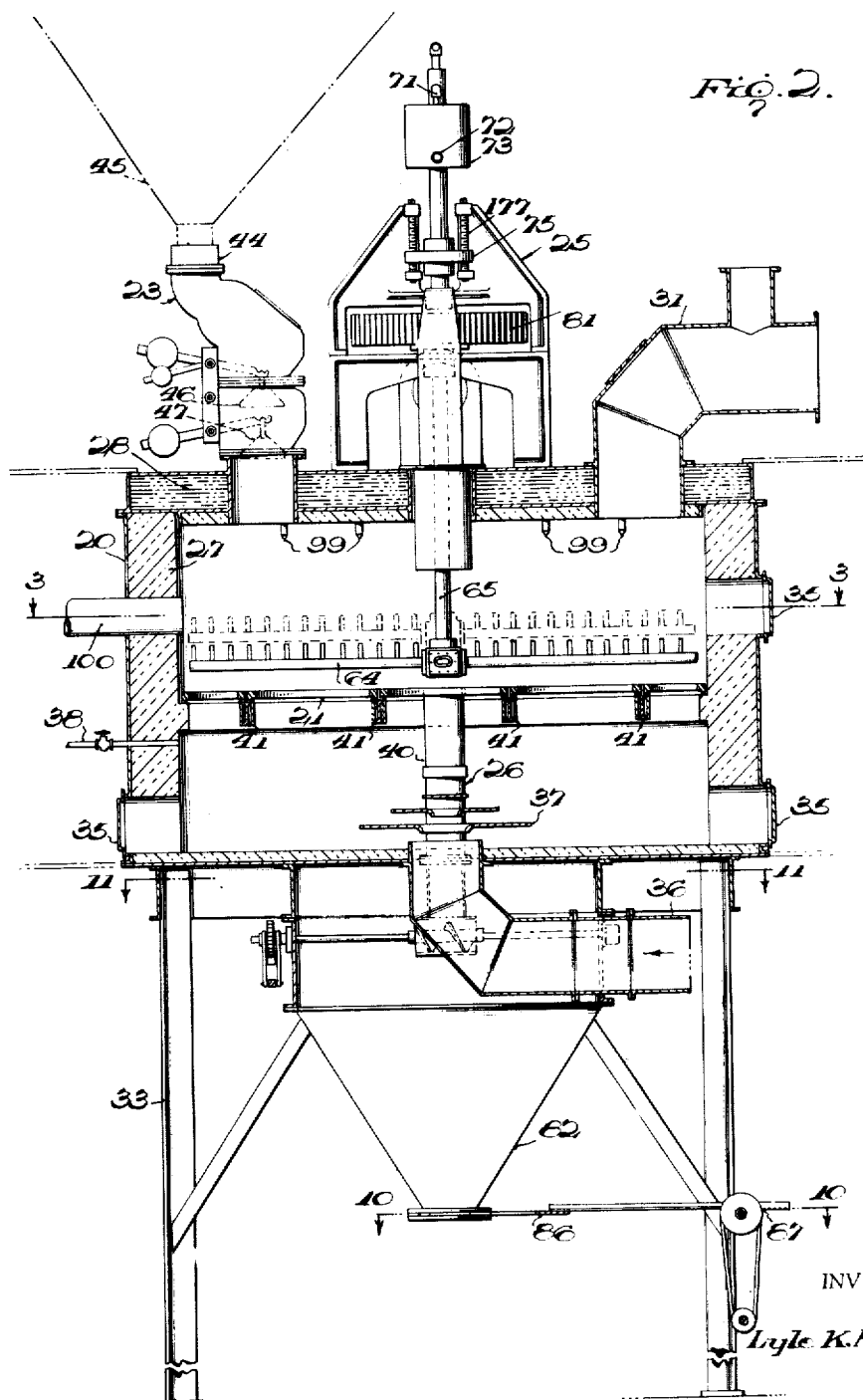

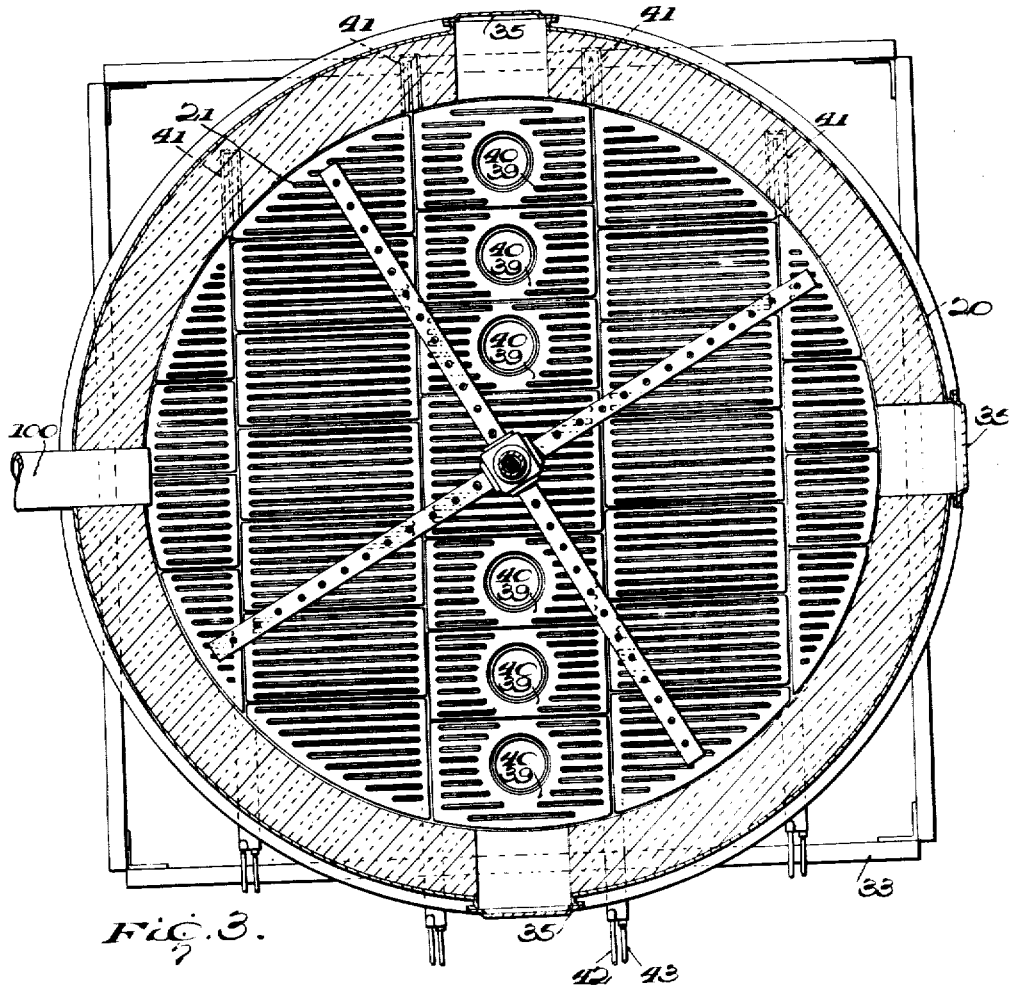

March 8, 1955 L. K. HERNDON 2,703,749
SLUDGE DECOMPOSING KILN
Filed May 29, 1951 6 Sheets-Sheet 4
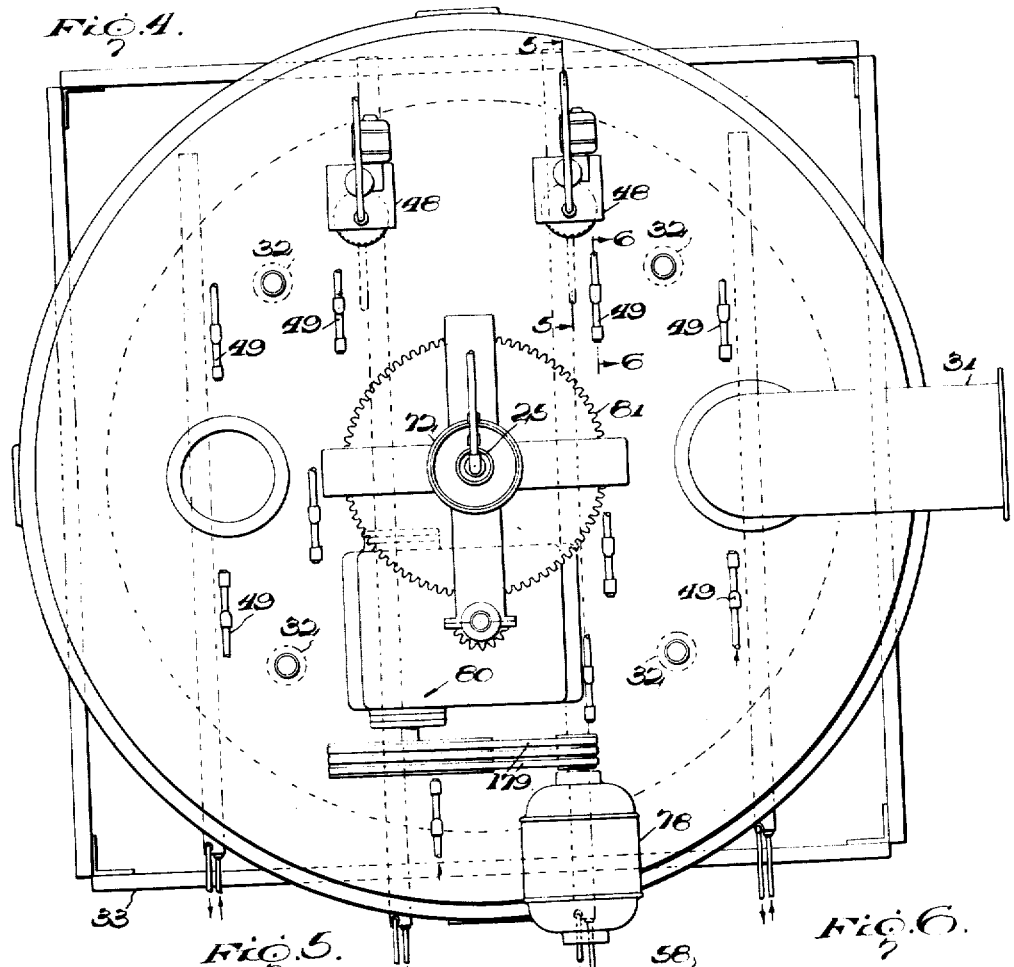
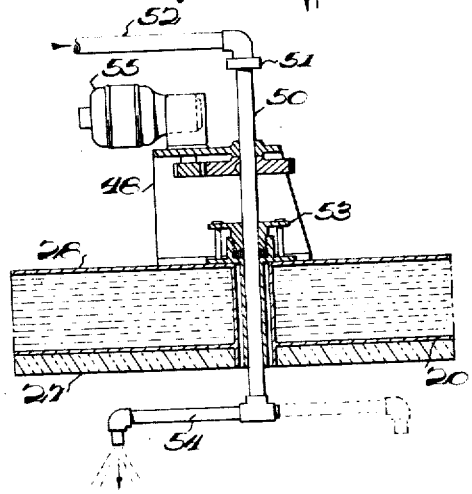
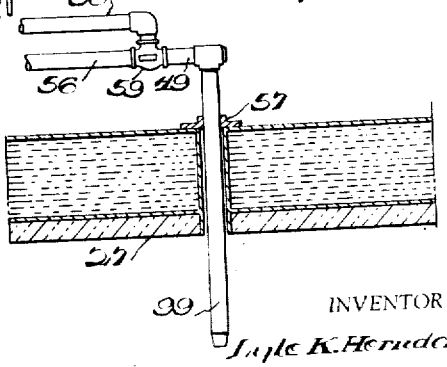
INVENTOR
Lyle K. Herndon
BY Adams, Forward & McLean
ATTORNEY

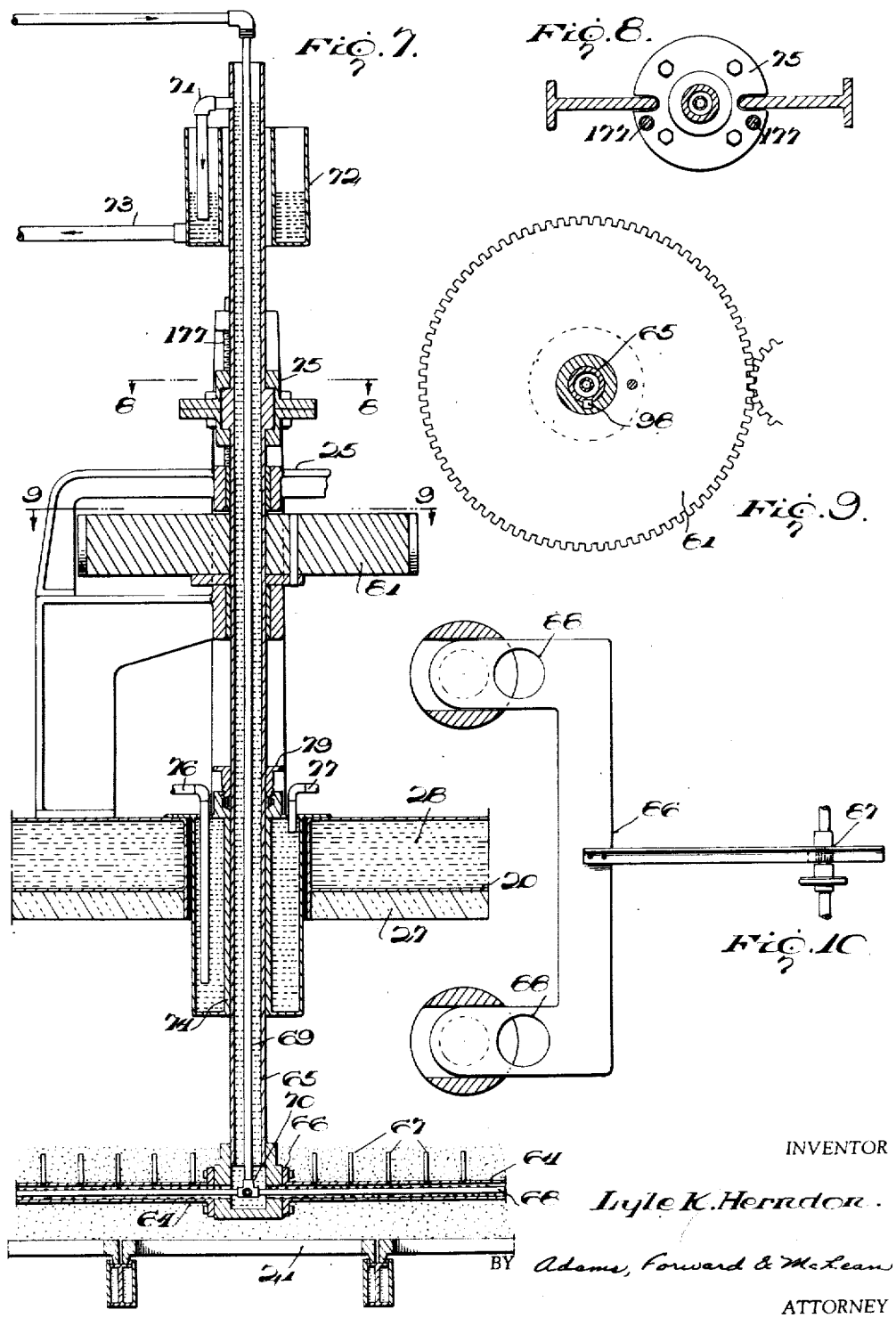

INVENTOR
Lyle K. Herndon.
BY Adams, Forward & McLean
ATTORNEY

2,703,749

SLUDGE DECOMPOSING KILN

Lyle Kermit Herndon, Columbus, Ohio, assignor, by mesne assignments, to The Fluor Corporation, Ltd., a corporation of California Application May 29, 1951, Serial No. 228,896

3 Claims. (Cl. 23—278)

My invention is directed to an improved sludge decomposing kiln for recovering sulfur values from the waste products of oil refinery processes in which sulfuric acid is used. More particularly, my invention pertains to an improved kiln of large capacity especially adapted for decomposing acid sludge of the type which forms more coke than is required for the coke bed, the excess coke being removed from the combustion zone in a novel manner which does not adversely affect the proper distribution of air to the incandescent coke bed. The sludge decomposing kilns of the prior art have not proved capable of handling large quantities of coke-forming sludge because no satisfactory excess coke discharge device has been provided for removing the large amounts of coke formed and therefore the recovery of sulfur values from coke-forming acid sludges has been a very expensive and inefficient operation. By the present invention, however, large scale operations may be economically performed for a unique and efficient coke removal system has been provided by which the excess coke is removed from the bottom of the coke bed at a rate which maintains the bed at a uniform depth and in a manner which allows the supply of the proper amounts of air to each portion of the bed.

According to the present invention, the sludge-formed coke is immediately mixed into the incandescent bed by a rotating rabbler, thereby eliminating any possible insulating effect the newly-formed coke may have between the incoming sludge and the hot bed. As the coke bed is moved across the grate by the rabbler, the excess coke falls into coke removal pipes and is conducted through a space below the grate in the absence of air into a suitable receiving hopper, the quantity of excess coke flowing from the pipes into the hopper being controlled by a screw conveying means mounted in the lower end of each of the pipes and operated at the rate required for maintaining the coke bed at its optimum thickness. The arrangement of the coke removal pipes is such as to allow substantially unobstructed air supply to the coke bed on the grate and distribution to the entire bed thereby insuring optimum combustion conditions, while at the same time accomplishing the excess coke removal operation in a manner which maintains the bed at an even thickness throughout.

In order that my invention may be more fully understood, it will now be described with reference to the accompanying drawings, in which:

Figs. 1 and 2 are vertical sections of the kiln apparatus;

Fig. 3 is a horizontal section taken on line 3—3 of Fig. 2;

Fig. 4 is a top view of the kiln apparatus;

Fig. 5 is a side view of a rotating sludge distributor employed in the kiln apparatus;

Fig. 6 is a side view of a fixed sludge distributor employed in the kiln apparatus;

Fig. 7 is a vertical section of the fuel bed agitating means of the instant invention;

Fig. 8 is a horizontal section taken on line 8—8 of Fig. 7 which has to be rotated 90 degrees and showing the vertical adjusting means for the self aligning thrust bearing;

Fig. 9 is a horizontal section of the rabbler drive means taken on line 9—9 of Fig. 7;

Fig. 10 is a horizontal section taken on line 10—10 of Fig. 2 and showing the coke hopper slide valves;

Figure 11:
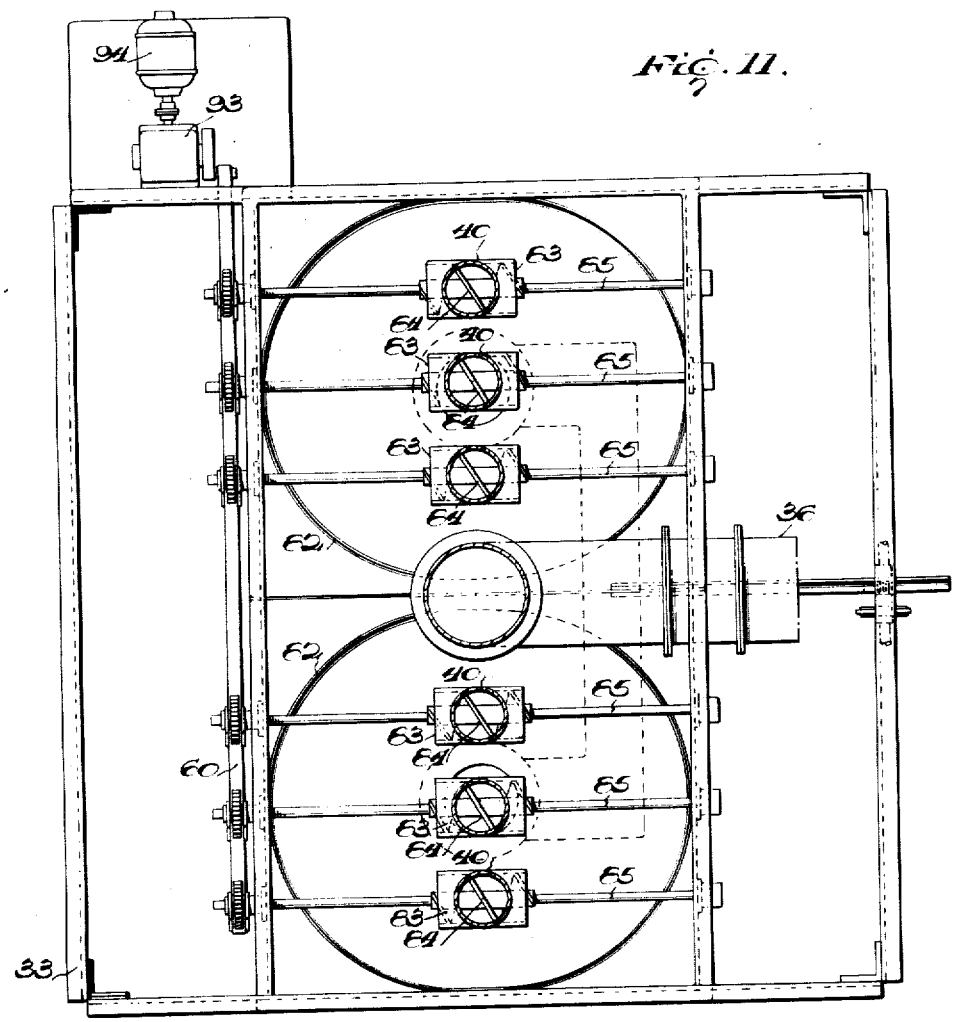
Figure 12:
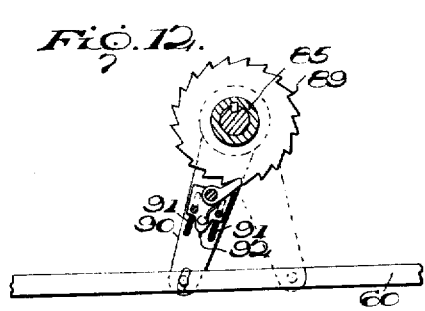
Figure 13:
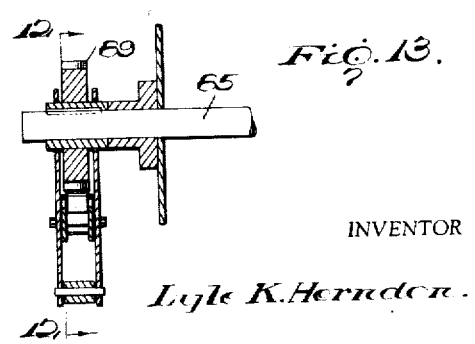

Fig. 11 is a horizontal section of the coke removal means taken on line 11—11 in Fig. 2; and Figs. 12 and 13 are views of the adjustable ratchet means which rotates the coke conveyor screw, Fig. 12 being taken on line 12—12 of Fig. 13.

Figure 1:
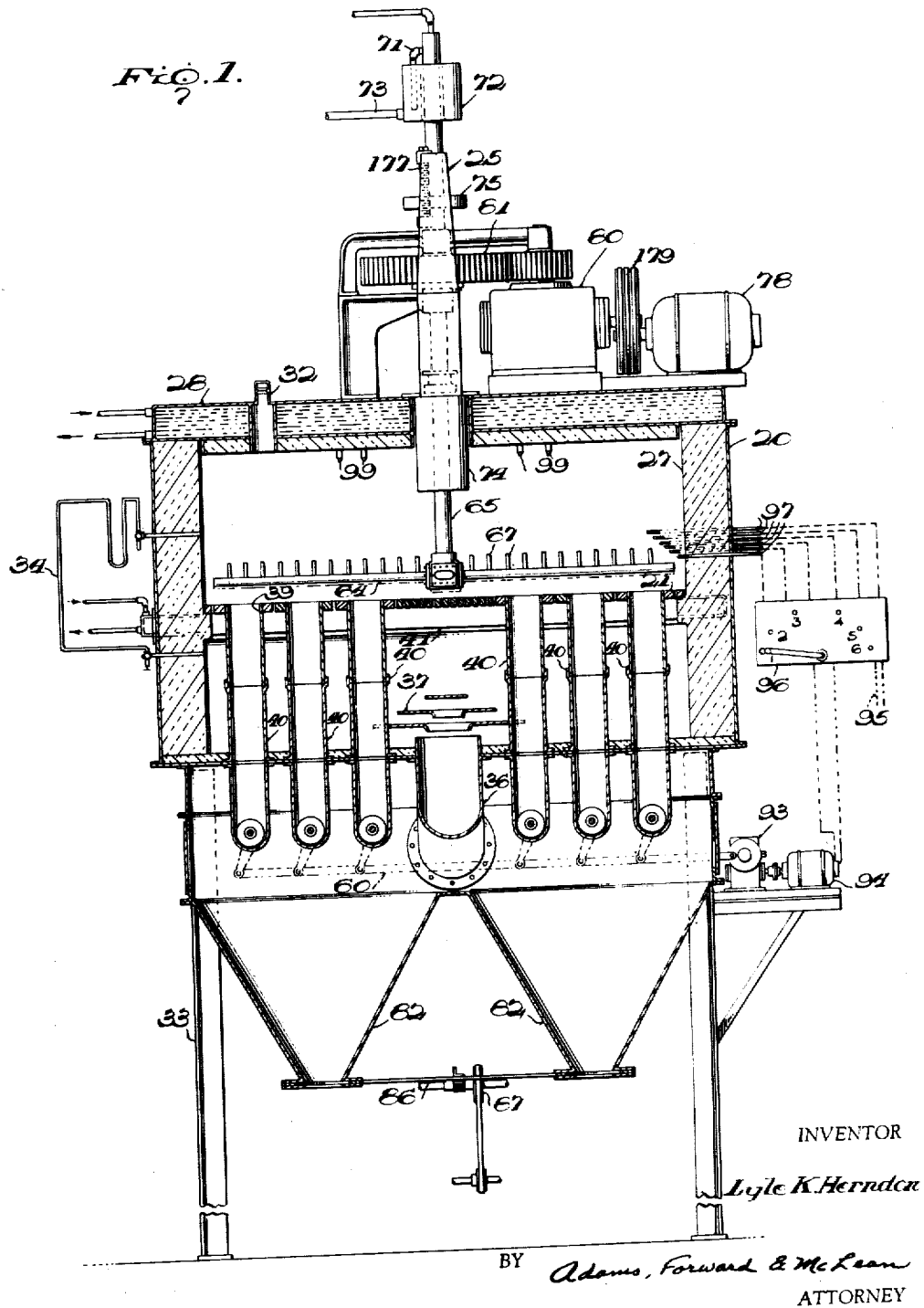

Referring particularly to Figs. 1 to 3, it will be seen that the present invention includes a base structure 33 upon which is mounted a cylindrical shell 20 which is lined with insulating material 27 and equipped with ceiling water tanks 28 to withstand the high temperatures encountered. To facilitate combustion control within the shell, it is equipped with a manometer 34 and observation holes 32; to allow periodic cleaning, inspection, and repair, access doors 35 and a steam purge line 38 are provided. Mounted in the shell are the grate supports 41 cooled by water entering at 43 and leaving at 42 upon which are placed the grate sections which make up the circular grate 21. It will be noted that the grate 21 divides the shell 20 into an upper combustion space and a lower air space and that coke discharge pipes 40 extend downwardly from the grate through the air space and into an excess coke hopper 82.

Initially to form an incandescent bed on the grate 21, coke is fed by the coke feeder 23 shown in Fig. 2, which is mounted on the top of shell 20 and comprises a passageway 44 for delivering coke from the hopper 45 to the upper bell 46. In passing the coke to the kiln, the upper bell 46 and the lower bell 47 are automatically raised and lowered alternately at a predetermined rate in accord with the desired combustion conditions, their action being so timed that one bell is open only when the other is closed.

When a suitable incandescent coke bed has been built up by the use of the coke feeder 23, the acid sludge may be flowed onto the top of the bed. For this purpose the sludge distributors are mounted in the top of the shell 20 in spaced relationship to each other on two concentric circles as shown in Fig. 4. Two preferred types of sludge distributors which may be employed include the rotating sludge distributor 48 shown in Fig. 5 and the fixed sludge distributor 49 shown in Fig. 6. The rotating sludge distributor 48 may be positioned on the outer circle as shown in Fig. 4 and comprises an inlet pipe 50 which is rotatably mounted in a bearing 51 at the end of the sludge supply line 52. A stuffing box 53 prevents the passage of gases from the shell 20 and a swing arm 54 is connected to the lower end of the inlet pipe 50 for flowing the sludge onto the incandescent coke bed upon rotation by the motor 55. The fixed sludge distributor 49 has a sludge tube 56 connected to a three-way cock 59 which is provided with a steam connection 58 whereby the incoming sludge in tube 56 and the steam in connection 58 may be admixed and driven through the nozzle 99 into the combustion chamber when such a combination is desired. The nozzle 99 passes through the sealing ring 57. The steam may also be separately passed through the nozzle 99 by proper operation of the three-way cock 59 when it is desired to clean the nozzle 99.

As the acid sludge becomes heated, it gives off sulfur dioxide which passes out through gas outlet 31 and forms excess coke which is mixed into the original coke bed by a rabbler means. As seen in Figs. 1, 2 and 7, the rabbler means includes four radially extending agitator arms 64 which are connected to the agitator shaft 65 by means of the bolted flange connections 66. The arms 64 have a flattened oval shape to facilitate passage through the bed and are provided with a plurality of fingers 67 which extend upwardly into the bed for added agitation thereof. Cooling water flows down pipe 69, which is centrally disposed within the agitator shaft 65, to the connection 70, outwardly through pipes 68 in the arms 64 and inwardly through the substantially annular space between the pipes 68 and the arms 64, and thence upwardly through the annular space between the pipe 69 and the agitator shaft 65 to the overflow pipe 71. A water overflow trough 72, which has a discharge tube 73, surrounds the agitator shaft 65 and the water overflow pipe 71 is in continuous communication therewith during rotation of the agitator shaft 65. The agitator shaft 65 passes upwardly through a lower bearing 74, past the motor drive means, and through the upper self-aligning thrust bearing 75. To water cool the lower bearing 74 to the proper operating temperature, it is provided with an inlet 76 and outlet 77; a stuffing box 79 is provided to prevent the passage of gases outwardly along the agitator shaft 65. The upper bearing 75 is a self-aligning thrust bearing which may be raised and lowered by rotation of the vertical adjusting screws 177, the screws having upper end portions formed to receive a suitable wrench. It will be seen, therefore, that vertical adjustment of the thrust bearing 75 causes the rabbler arms 64 to be moved vertically to a similar degree, thereby providing a means for adjusting the height of the rabbler above the grate 21 to accommodate coke beds of varying optimum thicknesses. As seen in Fig. 1, the motor drive means for rotating the rabbler is positioned on top of the shell 20 and includes a variable speed motor 78 connected by means of V belts 179 to a gear speed reducer 80. The rabbler drive gear 81 engages an elongated keyway 98 in the agitator shaft 65 as shown in Fig. 9 to allow the shaft 65 to move vertically therethrough upon motivation by means of the adjusting screws 177 without the necessity of disconnecting the motor drive means in any manner. While I have described a particular means for elevating and lowering the rabbler, it will be understood that other means may be substituted therefor, such as for example, a winch apparatus.

Passing upwardly through the hopper 82 is an air supply pipe 36 which enters the bottom of the shell 20 for supplying the air needed for combustion to the air space below the grate 21. Immediately above the upper end of the air supply pipe 36 are air distributors 37 which disperse the incoming air to all parts of the air space, thereby insuring the proper distribution of air to each portion of the coke bed.

As shown in Fig. 2 a conduit 100 for supplying secondary air to the combustion space when desired is provided in the side wall of the shell.

Referring now to the coke discharge pipes 40, it will be noted that the upper sections thereof are slip jointed into the lower sections 26 for easy removal and replacement, the upper sections being made of a refractory material, capable of withstanding the high temperatures of the coke bed. The coke discharge pipes 40 extend through the air space below the grate and into the hopper 82 to form a conduit through which the excess hot coke may gravitate from the coke bed to the hopper 82 without contact with the air in the air space. At the bottom of the hopper 82 are slide valves 86 shown in Fig. 10 which may be moved horizontally by means of the rack and pinion 87 to align the valve holes 88 with the openings in the hopper 82. The coke upon discharge from the hopper may be cooled by a water spray and then conveyed therefrom by any suitable means such as for example a screw type or apron type conveyor.

As seen in Figs. 11 to 13 the bottom of each coke discharge pipe 40 is provided with a screw conveying means which regulates the flow of excess coke from the coke bed into the hopper 82. Each screw conveying means includes a shaft 85 having a screw 84 keyed thereon which is contained within the conveyor housing 83 and is powered through suitable linkages by a motor 94 and a speed reducer 93. Although the rabbler means is capable of maintaining the coke bed at uniform depth throughout by agitating the bed in a manner such that the excess coke from each portion of the bed is moved into the coke discharge pipes, it is sometimes advantageous to assist the rabbler means in the performance of this operation by operating the conveying means so that the quantity of excess coke removed through each discharge pipe varies directly in accordance with its distance from the center of the bed. This is accomplished, as seen in Figs. 12 and 13, by providing the lever 90 with adjusting slots 91 in which a pawl and spring assembly 92 may be adjustably bolted so that the number of ratchet wheel teeth which the pawl passes over on each back-stroke of the reciprocating lever 60 may be regulated. It will be seen therefore that by this arrangement the outer conveying screws 84 can be adjusted to rotate a greater amount than the inner screws per throw of the reciprocating lever 60 and thereby remove excess coke from the outer portions of the bed at a faster rate than from the inner portions of the bed. By suitable modifications, of course, other types of conveying means may be employed to remove the excess coke such as, for example, an apron conveyor.

In Fig. 1 is shown an arrangement for operating the excess coke discharge means automatically in response to the depth of the incandescent coke bed so that the bed may be maintained at a predetermined optimum thickness. A control circuit is provided which is arranged to connect the coke discharge motor 94 across the power line 95 upon receipt of a predetermined signal by an electrode selector 96 from one of the electrodes 97. The electrodes 97 are mounted in the sidewall of the shell 20 in horizontally and vertically spaced relationship to each other and may be individually connected to the coke discharge motor circuit by the selector 96 to allow automatic maintenance of the coke bed at different thicknesses. Since the optimum coke bed depth varies with the characteristics of the operation being performed, the spaced electrodes 97 provide the means for maintaining the hot fuel bed at the optimum level.

In the operation of the kiln, which may be continuously or intermittently operated as desired, a uniform incandescent coke bed is formed on the grate 21 by delivery of the coke through coke feeder 23, the fuel bed agitator being continuously rotated at a speed of 0.1 to 10 revolutions per minute and preferably within the range of 0.5 to 5 revolutions per minute to insure even distribution of the coke in the bed. The air needed for combustion is supplied at a proper rate through the supply pipe 36, and is evenly distributed throughout the air space under the grate 21 by the air distributors 37. When an incandescent bed of sufficient thickness and temperature is formed, the acid sludge, which may be the by-product of refining petroleum oils, alkylation acid from the alkylation of hydrocarbons, or mixtures thereof, is introduced through the sludge distributors. The acid sludge, which flows downwardly in streams onto the surface of the incandescent fuel bed, is pyrolyzed to form sulfur dioxide, water and a small proportion of hydrocarbon vapor. Coke is also formed from the hydrocarbon content of the acid sludge and thereupon becomes part of the coke bed. Meanwhile the fuel bed agitator is continuously rotated so that the surface of the bed is stirred and the coke formed from the acid sludge is distributed evenly throughout the coke bed. The newly-formed coke is raised to incandescent temperature by the coke bed and since the amount of coke necessary to provide the heat for carrying out the reaction is usually less than the amount which is formed by the reaction, coke is withdrawn through the coke discharge pipes 40 by the conveyor screws 84 and dumped into the hopper 82.

As the optimum combustion conditions vary with the different types of operation, it is advantageous to vary the depth of the coke bed in accordance with the particular characteristics of the sludge being treated. During operation, the coke bed is maintained at the proper predetermined depth for the efficient pyrolyzation of the particular acid sludge being flowed thereon by means of the electrode selector 96 which is selectively connected to the proper electrode 97. In this manner the hot section of the bed may be maintained at a substantially constant and preselected level since, upon contact with the selected electrode 97, the conveyor screw motor 94 is energized, thereby removing coke from the bottom of the coke bed. When the hot section of the bed has moved downwardly out of contact with the selected electrode 97, the power to the screw motor 94 is cut off, allowing the coke bed to build up again to the level of the selected electrode. In this manner it is possible to pyrolyze acid sludge of varying characteristics in an efficient and easy manner.

When the optimum operating depth of the coke bed is adjusted as explained above, the rabbler may advantageously be moved vertically to insure the positioning of the fingers 67 immediately below the surface of acid sludge layer on the top of the coke bed. This is accomplished by rotation of the adjusting screws 177 to elevate or lower the thrust bearing 75 and thereby cause the elevation or lowering of the agitator shaft 65.

As the rabbler rotates, it causes the excess coke to settle downwardly to the lower portion of the bed where it is moved horizontally to the coke discharge pipes 40. If the selected electrode 97 sends a signal to the electrode selector 96 indicating that hot coke is present at that level, the conveyor screws 84 will be rotated and the required amount of coke will be discharged into the hopper 82.

By the unique structural arrangement of my kiln, therefore, the efficient and economic pyrolyzation of large quantities of acid sludge of the type which forms large amounts of excess coke may be performed. As has been explained, the coke discharge pipes which conduct the excess coke from the coke bed to the excess coke hopper present very little obstruction to the flow of air into the air space beneath the grate, while at the same time providing a highly satisfactory means for removing the excess coke from the coke bed in an easily controlled manner. It is this important feature, in part at least, which has made the previously expensive pyrolyzation of excess coke-forming sludge economically attractive.

I claim:

1. In a decomposing kiln for recovering sulfur values from acid sludge, a cylindrical shell, a circular grate for supporting a coke bed mounted in the shell and defining an upper combustion space and a lower air space, said grate containing air passing apertures distributed at spaced locations across the major portion of the grate area, said grate having coke discharge pipes with upper ends mounted in the grate and extending downwardly through the air space and through the bottom of said shell, rabbler means rotatably mounted on said shell and extending into said coke bed for moving the coke bed over said holes to supply said pipes with excess coke from each portion of the bed, said rabbler means being positioned to pass directly over said upper ends of said coke discharge pipes to assure effective movement of the coke into said pipes, means for regulating the flow of excess coke through the coke discharge pipes, air supply means connected to the shell for supplying air to the lower air space, said shell being open to the flow of air from said supply means upwardly through said grate apertures, and air distributing baffle means within the lower air space positioned to distribute the air from said supply means across the area of the grate.

2. In a decomposing kiln for recovering sulfur values from acid sludge, a cylindrical shell, a coke hopper connected to the bottom of the shell, a circular grate for supporting a coke bed mounted in the shell and defining an upper combustion space and a lower air space, said grate containing air passing apertures distributed at spaced locations across the major portion of the grate area, said grate having a plurality of diametrically-aligned coke discharge pipes with upwardly opening upper ends mounted in the grate at positions spaced different distances from the center of said grate, said pipes extending downwardly from said upper ends and through said air space into said coke hopper, rabbler means rotatably mounted on said shell and extending into said coke bed for moving the coke bed over said holes to supply said pipes with excess coke from each portion of the bed, said rabbler means being positioned to pass directly over said upper ends of said coke discharge pipes to assure effective movement of the coke into said pipes, screw conveyor means connected to said discharge pipes for regulating the flow of excess coke therethrough, air supply means connected to said shell for supplying air to the air space, said shell being open to the flow of air from said supply means upwardly through said grate apertures, air distributing baffle means within the air space positioned to distribute the air from said supply means across the area of the grate, means for supplying sludge to said coke bed, and means for discharging gas from said combustion space.

3. In a decomposing kiln for recovering sulfur values from acid sludge, a cylindrical shell, a circular grate for supporting a coke bed mounted in the shell and defining an upper combustion space and a lower air space, said grate having a plurality of coke discharge pipes with upwardly facing upper ends mounted in the grate at positions spaced different distances from the center of said grate said discharge pipes extending downwardly from said upper ends through the air space and through the bottom of said shell, rabbler means rotatably mounted on said shell and extending into said coke bed for moving the coke bed over said holes to supply said pipes with excess coke from each portion of the bed, said rabbler means being positioned to pass directly over said upper ends of said coke discharge pipes to assure effective movement of the coke into said pipes, means for regulating the flow of excess coke through the coke discharge pipes, air supply means connected to the shell for supplying air to the lower air space, and air distributing baffle means within the lower air space positioned to distribute the air from said supply means across the area of the grate.

References Cited in the file of this patent

UNITED STATES PATENTS

| | | |
|---|---|---|
| 1,444,209 | Pike | Feb. 6, 1923 |
| 1,516,934 | Thornhill | Nov. 25, 1924 |
| 2,040,583 | West et al. | May 12, 1936 |
| 2,074,061 | Mullen | Mar. 16, 1937 |
| 2,086,733 | Mullen | July 13, 1937 |
| 2,391,328 | Mohr | Dec. 18, 1945 |
| 2,451,024 | Ellerbeck | Oct. 12, 1948 |
| 2,506,782 | Fallon | May 8, 1950 |

FOREIGN PATENTS

| | | |
|---|---|---|
| 828,014 | France | Feb. 2, 1938 |